(12) United States Patent
Aso et al.

(10) Patent No.: US 7,291,996 B2
(45) Date of Patent: Nov. 6, 2007

(54) OPTICAL DISC DRIVE AND BRAKE CONTROL METHOD THEREOF

(75) Inventors: Yoshiaki Aso, Atsugi (JP); Takashi Tateshima, Atsugi (JP); Tatsuya Goto, Atsugi (JP)

(73) Assignee: Mitsumi Electric Co., Ltd. (JP)

(*) Notice: Subject to any disclaimer, the term of this patent is extended or adjusted under 35 U.S.C. 154(b) by 762 days.

(21) Appl. No.: 10/671,752

(22) Filed: Sep. 25, 2003

(65) Prior Publication Data

US 2004/0062163 A1   Apr. 1, 2004

(30) Foreign Application Priority Data

Sep. 30, 2002   (JP) ............... 2002-287911

(51) Int. Cl.
*H02P 3/08* (2006.01)
*H02P 3/18* (2006.01)
*G11B 19/22* (2006.01)

(52) U.S. Cl. ............ 318/370; 318/254; 318/138; 318/439; 360/74.1; 360/90; 369/232

(58) Field of Classification Search ............ None
See application file for complete search history.

(56) References Cited

U.S. PATENT DOCUMENTS

| | | | | |
|---|---|---|---|---|
| 4,794,311 A | * | 12/1988 | Kiya et al. | 318/569 |
| 5,184,049 A | * | 2/1993 | Kiuchi | 318/362 |
| 5,701,284 A | | 12/1997 | Lee | |
| 5,874,817 A | | 2/1999 | Yashita et al. | |
| 5,894,204 A | * | 4/1999 | Kumita | 318/364 |
| 6,046,559 A | * | 4/2000 | Iwasaki | 318/364 |
| 6,531,839 B1 | * | 3/2003 | Shin et al. | 318/371 |
| 6,611,658 B1 | | 8/2003 | Takahashi | |
| 7,038,410 B2 | * | 5/2006 | Delaporte | 318/293 |
| 7,046,603 B2 | * | 5/2006 | Mochizuki et al. | 369/53.18 |
| 2006/0152098 A1 | * | 7/2006 | Horst et al. | 310/120 |

FOREIGN PATENT DOCUMENTS

| | | |
|---|---|---|
| JP | 09044859 | 2/1997 |
| JP | 09285174 | 10/1997 |
| JP | 11096649 | 4/1999 |
| JP | 2000163864 | 6/2000 |
| JP | 2001-155417 | 6/2001 |

* cited by examiner

*Primary Examiner*—Lincoln Donovan
*Assistant Examiner*—Eduardo Colon
(74) *Attorney, Agent, or Firm*—Marger Johnson & McCollom, P.C.

(57) ABSTRACT

An optical disc drive 1 includes a spindle motor 11 for rotating the optical disc 2 and a spindle driver for driving the spindle motor 11 equipped with a rotation number counter 232 for measuring the rotation number of the spindle motor 11. A brake for braking the spindle motor 11 to reduce the rotation number thereof, can include at least three types of brake modes, and a selector for selecting one of the types of brake modes in response to the rotation number measured by the rotation number counter 232 when the rotation number of the spindle motor 11 is to be reduced. The optical disc drive 1 may further include a judging circuit for judging whether the rotation number of spindle motor 11 measured by the rotation number counter 232 reaches a predetermined target rotation number when the rotation of the optical disc 2 is to be stopped by the spindle motor 11. In this case, the application of the brake is completed when the rotation number of the spindle motor 11 reaches the predetermined target rotation number.

6 Claims, 7 Drawing Sheets

|     | Deg | 60  | 120 | 180 | 240 | 300 | 360 |
| --- | --- | --- | --- | --- | --- | --- | --- |
| Q1  | NR  | ON  | ON  | OFF | OFF | OFF | OFF |
|     | SB  | OFF | OFF | OFF | ON  | ON  | OFF |
|     | RR  | OFF | OFF | OFF | OFF | OFF | OFF |
| Q2  | NR  | OFF | OFF | ON  | ON  | OFF | OFF |
|     | SB  | ON  | OFF | OFF | OFF | OFF | ON  |
|     | RR  | OFF | OFF | OFF | OFF | OFF | OFF |
| Q3  | NR  | OFF | OFF | OFF | OFF | ON  | ON  |
|     | SB  | OFF | ON  | ON  | OFF | OFF | OFF |
|     | RR  | OFF | OFF | OFF | OFF | OFF | OFF |
| Q4  | NR  | OFF | OFF | OFF | ON  | ON  | OFF |
|     | SB  | ON  | ON  | OFF | OFF | OFF | OFF |
|     | RR  | ON  | ON  | OFF | OFF | OFF | OFF |
| Q5  | NR  | ON  | OFF | OFF | OFF | OFF | ON  |
|     | SB  | OFF | OFF | ON  | ON  | OFF | OFF |
|     | RR  | OFF | OFF | ON  | ON  | OFF | OFF |
| Q6  | NR  | OFF | ON  | ON  | OFF | OFF | OFF |
|     | SB  | OFF | OFF | OFF | OFF | ON  | ON  |
|     | RR  | OFF | OFF | OFF | OFF | ON  | ON  |

OPTICAL DISC DRIVE AND BRAKE CONTROL METHOD THEREOF

FIELD OF THE INVENTION

The present invention is-related to an optical disc drive that carries out reproducing data from or recording and reproducing data onto and from an optical disc, and to a brake control method of an optical disc drive.

DESCRIPTION OF THE PRIOR ART

In recent years, optical disc drives capable of reproducing an optical disc such as a CD-ROM, a CD-R, a CD-RW or the like are able to reproduce data from such optical discs at speeds several tens times as fast as 1× speed. In accordance with standards, the optical disc reading speed must have a linear velocity of 1.2 to 1.4 m/s at 1× speed (equal speed or a reference speed), and for example, if such linear speed is 1.4 m/s (i.e., in the case where data in the innermost portion is being reproduced), and an optical disc is reproduced at 48× speed, then the optical disc is rotated at a high speed of approximately 10,000 rpm.

Further, in an optical disc drive rotating an optical disc at such high speed, in addition to completely stopping the rotation of the optical disc, depending on the contents of an optical disc (media) there are many occasions where the rotation of the optical disc needs to be slowed down (for example, during a search process in an application for a dictionary, reference or the like).

This operation is called a brake, and this brake operation generally uses a reverse rotation brake in which an electric current is supplied to a spindle motor so that the spindle motor electrically reverses its rotation in order to decelerate the rotation of the optical disc, and/or a short brake in which by shorting (causing short circuits) each coil of the spindle motor its own back electromotive force is used in order to decelerate the rotation of the optical disc. In this regard, Laid-Open Japanese Patent Publication No. 2000-163864 discloses a spindle motor driving circuit of an optical disc drive, and includes disclosure related to short brake control.

However, in an optical disc drive which rotates an optical disc at the high speed of approximately 10,000 rpm as described above, no matter which of the above-described brake controls is used, because the reverse current generated in the spindle motor is large, an excessively large current flows to the driver IC of the spindle motor, and therefore there is a risk that this IC will be damaged due to the generation of heat and the like.

SUMMARY OF THE INVENTION

It is an object of the present invention to provide an optical disc drive and a brake control method of an optical disc drive which make it possible to improve the reliability of a driver IC of a spindle motor by carrying out brake control using idling when an optical disc is rotated in a high speed range to prevent a large reverse current from flowing to the driver IC of the spindle motor.

In order to achieve the object, in one aspect of the present invention, the present invention is directed to an optical disc drive which can record and/or reproduce data onto and/or from an optical disc. The optical disc drive of the present invention comprises:

a spindle motor for rotating the optical disc, the spindle motor being a three-phase motor having three coils;

rotation number measuring means for measuring the rotation number of the spindle motor;

brake means for braking the spindle motor to reduce the rotation number thereof, the brake means including at least three types of brake modes; and selecting means for selecting one of the at least three types of brake modes in response to the rotation number measured by the rotation number measuring means when the rotation number of the spindle motor is to be reduced.

In this invention, it is preferred that the spindle motor is a three-phase motor having three coils, and that the at least three types of brake modes includes a first brake mode which uses windage loss by idling of the spindle motor, a second brake mode which uses a short brake that is made by causing short circuit in between any two coils of the three coils in the spindle motor, and a third brake mode which uses a reverse rotation brake that is made by controlling the current flow so as to rotate the spindle motor in the reverse direction of the normal rotation.

In this case, it is preferred that the rotational speed range of the spindle motor is divided into at least three ranges including a high range, a medium range and a low range, in which the first brake mode is used in the high range, the second brake mode is used in the medium range and the third brake mode is used in the low range.

It is preferred that the optical disc drive of the present invention further comprises judging means for judging whether the rotation number of the spindle motor measured by the rotation number measuring means reaches a predetermined target rotation number when the brake means is applied to the spindle motor, wherein the application of the brake means is completed when the judging means judges that the rotation number of the spindle motor reaches the predetermined target rotation number.

In this case, it is preferred that the predetermined target rotation number includes a rotation number at which the rotation of the optical disc is considered to be stopped.

Further, it is preferred that the spindle motor includes a magnet rotor.

In this case, it is preferred that the optical disc drive of the present invention further comprises position detecting means for detecting the position of the magnet rotor in the spindle motor, the position detecting means including a plurality of hall elements disposed on the magnet rotor so as to be spaced at certain intervals.

Further, in this case, it is preferred that the rotation number measuring means measures the rotation number of the spindle motor based on the pulse number outputted from the plurality of hall elements.

In this invention, it is preferred that the optical disc drive of the present invention further comprises a driver for driving the spindle motor, the driver including a plurality of switching elements and switching means for switching between on and off of each of the plurality of switching elements wherein the selecting means is operated by switching these switching elements by means of the switching means.

In this case, it is preferred that each of the plurality of switching elements is constituted from an NPN type transistor.

In another aspect of the present invention, the present invention is directed to a brake control method of an optical disc drive in which the optical disc drive is capable of recording and/or reproducing data onto and/or from an optical disc by rotating the optical disc by means of a spindle motor. The method of the present invention comprises the steps of:

measuring the rotation number of the spindle motor; and
controlling the spindle motor based on the measured rotation number so that the rotation number of the spindle motor is reduced by windage loss of idling of the spindle motor when the spindle motor rotates at a predetermined high-speed range.

Further, in yet another aspect of the present invention, the present invention is directed to a brake control method of an optical disc drive in which the optical disc drive is capable of recording and/or reproducing data onto and/or from an optical disc by rotating the optical disc by means of a spindle motor. The method of the present invention comprises the steps of:

a) measuring the rotation number of the spindle motor;
b) judging whether the measured rotation number of the spindle motor reaches a predetermined target rotation number or not;
c) judging which rotational speed range the measured rotation number of the spindle motor is among a high-speed range, a medium-speed range and a low-speed range, in the case where the rotation number of the spindle motor does not reach the predetermined target rotation number;
d) based on the judged speed range, selecting one of at least three types of brake modes;
e) braking the spindle motor to reduce the rotation number thereof by the selected brake mode; and
f) repeating the steps a) through e) until the measured rotation number of the spindle motor reaches the predetermined target rotation number.

In this invention, it is preferred that the spindle motor is a three-phase motor having three coils, and wherein the at least three types of brake modes includes a first brake mode which uses windage loss by idling of the spindle motor, a second brake mode which uses a short brake that is made by causing short circuit in between any two coils of the three coils in the spindle motor, and a third brake mode which uses a reverse rotation brake that is made by controlling the current flow so as to rotate the spindle motor in the reverse direction of the normal rotation.

In this case, it is preferred that, in the braking step, the idling brake is used when the measured rotation number of the spindle motor is in the high-speed range, the short brake is used when the measured rotation number is in the medium-speed range, and the reverse rotation brake is used when the measured rotation number is in the low-speed range.

The above described and other objects, structures and advantages of the present invention will be apparent when the following description of the preferred embodiment will proceed with reference to the appended drawings.

DETAILED DESCRIPTION OF THE PREFERRED EMBODIMENTS

The preferred embodiments of an optical disc drive and a brake control method of an optical disc drive according to the present invention are described below with reference to FIGS. 1-7. Now, it should be noted that the embodiments (disclosure) are to be considered as an exemplification, and therefore this structure should not be intended to limit the present invention to the specific embodiments illustrated.

Figure 1:
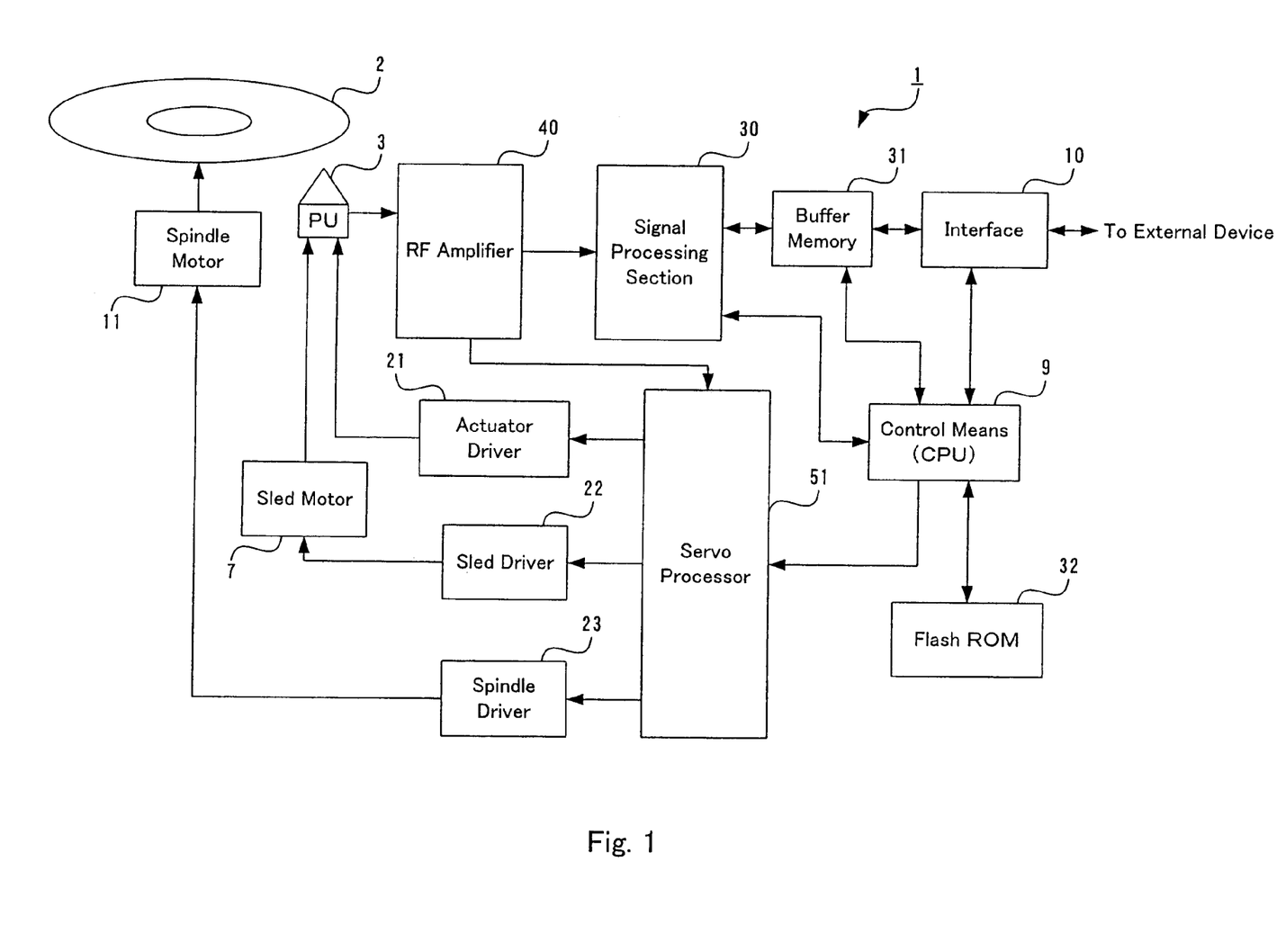
FIG. 1 is a schematic block diagram illustrating the main portion (circuit structure diagram) of the optical disc drive 1 of the present invention.
Figure 2:
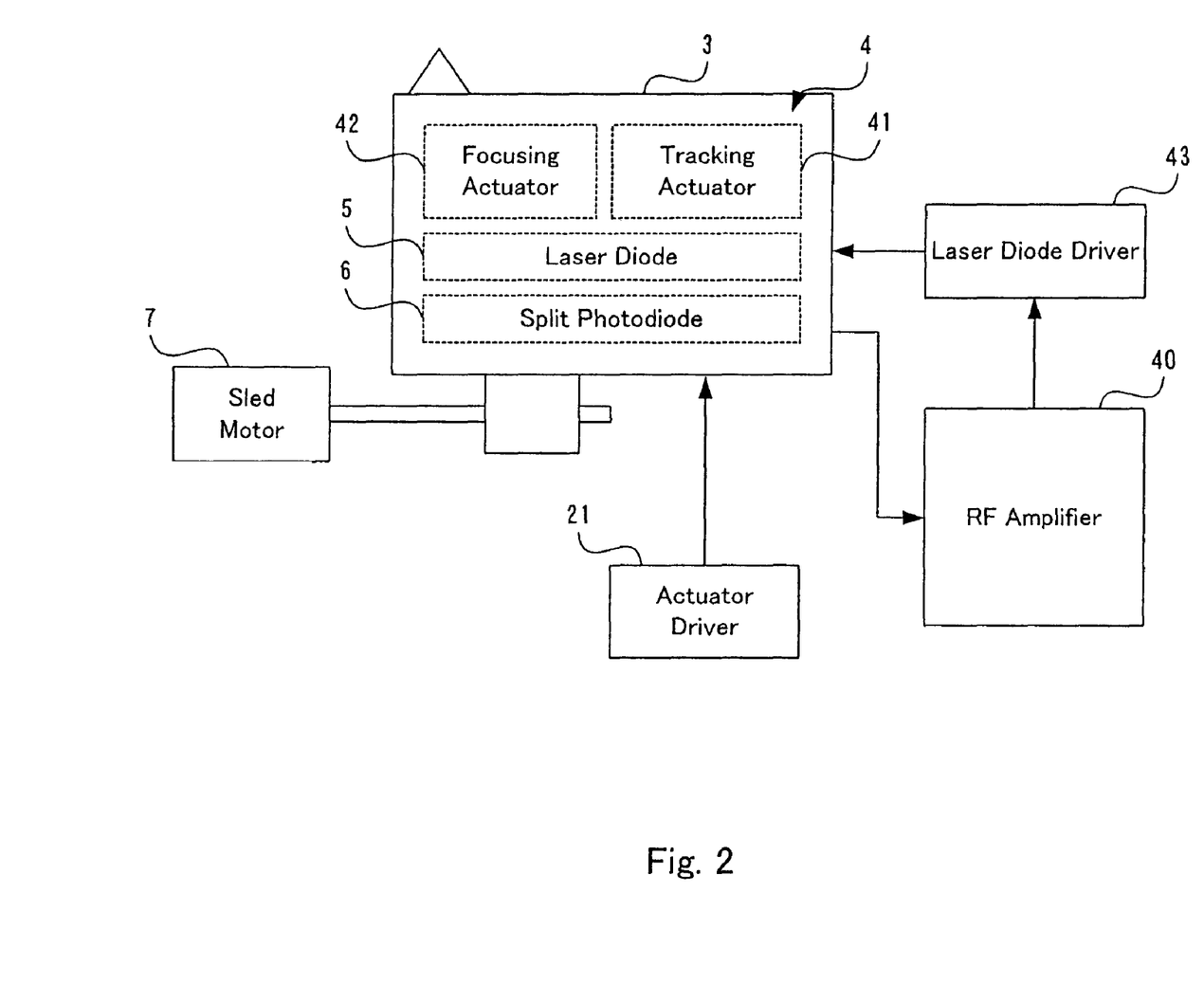
FIG. 2 is a diagram schematically illustrating an optical pick-up 3 and a part of elements related thereto.

First, a description will be given for the structure of an optical disc drive 1 of the present invention. FIG. 1 is a schematic block diagram illustrating the main portion (circuit structure diagram) of the optical disc drive 1 of the present invention. In FIG. 1, the optical disc drive 1 of the present invention is a disc drive that records and/or reproduces data onto and/or from an optical disc 2 such as a CD-ROM, a CD-R, a CD-RW or the like. Further, FIG. 2 is a diagram schematically illustrating an optical pick-up 3 and a part of elements related thereto. Hereinafter, the description will be given based on FIGS. 1 and 2. Here, even though it is not shown in the drawings, the optical disc drive 1 of the present invention is operated by an AC or DC power source supplied from the outside.

The optical disc drive 1 is equipped with a turntable (not shown in the drawings) on which the optical disc 2 is loaded, and a spindle motor 11 (described in detail later) which rotates the turntable (i.e., the optical disc 2) at a predetermined constant linear velocity. Further, the optical disc drive 1 is also equipped with a disc tray (not shown in the drawings) on which a media (optical disc) such as a CD-ROM, a CD-R, a CD-RW or the like is placed (loaded). The disc tray is moved (displaced) between a position for loading or ejecting the optical disc and a position for recording or reproducing information onto or from the optical disc.

Further, the optical disc drive 1 includes: an optical pick-up (optical head) 3 which is capable of moving in a radial direction of the loaded optical disc 2 (i.e., a radial direction of the turntable) to reproduce or record data from or onto the loaded optical disc 2; an optical pick-up base moving mechanism (not shown in the drawings) equipped with a sled motor 7 which moves an optical pick-up base of the optical pick-up 3 in the radial direction of the optical disc 2; an RF amplifier 40 which amplifies RF signals obtained by the optical pick-up 3 and then digitizes such RF signals to outputs digital data; a servo processor 51 which controls the driving (operation) of each drive portion of the spindle motor 11 and the like of the optical disc drive 1 based on the RF signals; a signal processing section 30 which demodulates (decodes) the sampling data (EFM signals), the sub-code data (digital data) and the like from the RF signals inputted from the RF amplifier 40; a buffer memory 31 which temporarily stores the sampling data (EFM signals) and the like demodulated by the signal processing section 30 and temporarily stores the data transferred from the host to be recorded onto the optical disc 2; control means (CPU) 9; a flash ROM 32 for storing optimized firmware and the like for the optical disc drive 1; an interface 10 which outputs the EFM signals and the like that were demodulated in the signal processing section 30 and temporarily stored in the buffer memory 31 to an external device (for example, host computer); an actuator driver 21 for driving actuators of the optical pick-up 3; a sled driver 22 for driving the sled motor 7; and a spindle driver 23 for driving the spindle motor 11; and a casing (not shown in the drawings) which houses all these elements. A detailed description of each portion is given below.

The control means 9 is generally constituted from a microcomputer (CPU). The control means 9 controls the overall of the elements of the optical disc drive 1, including the optical pick-up 3 (including the actuator 4, a laser diode 5, and the like), the sled motor 7, the spindle motor 11, the RF amplifier 40, the signal processing section 30, the servo processor 51, the interface 10, the buffer memory 31, the flash ROM 32 and the like. Further, the judging means and the selecting means (described later) in the present invention are mainly carried out by the control means 9.

In FIG. 2, the optical pick-up 3 includes an optical pick-up base equipped with a laser diode (light emitting portion) 5 and a split photodiode (light receiving portion) 6, and an objective lens (condenser) (not shown in the drawings) provided in the optical pick-up base.

The laser diode 5 is driven by a laser diode driver 43 controlled by the RF amplifier 40 and the control means 9 (not shown in FIG. 2), and emits a laser beam having a predetermined wavelength and any one of multiple power levels onto the optical disc 2. The split photodiode 6 includes one or more light receiving portions (not shown in the drawings) that receives the reflected light from the optical disc 2 of the light (laser beam) emitted from the laser diode 5. In the split photodiode 6, electric signals (reflected light-detection signals) of the voltage level corresponding to the amount of reflected light received by the light receiving portions are generated and outputted to the RF amplifier 40.

The objective lens is supported by suspension wires provided in the optical pick-up base, and is constructed so as to be capable of movement with respect to the optical pick-up base both in the radial direction of the optical disc 2 and in the rotational axis direction of the spindle motor 11 (i.e., a rotational axis direction of the turntable or an optical axis direction of the objective lens).

Further, the objective lens is arranged at a reference position (center point) for the objective lens which is predetermined on the optical pick-up base, namely, at a neutral position. When the objective lens is shifted from such reference position, the objective lens is biased toward the reference position by the restoring force of the suspension wires described above.

Further, as shown in FIG. 2, the optical pick-up 3 also includes the actuator 4 for moving the objective lens with respect to the optical pick-up base. The actuator 4 comprises a tracking actuator 41 for moving the objective lens in the radial direction of the optical disc 2, and a focusing actuator 42 for moving the objective lens with respect to the optical pick-up base in the rotational axis direction of the optical disc 2. The actuator 4, namely, the tracking actuator 41 and the focusing actuator 42 are constituted from a tracking coil and a focusing coil, which are driven by means of the actuator driver 21 by flowing electric current through the tracking coil and/or the focusing coil to interact with the magnetic fields of magnets (not shown in the drawings) provided near the coils.

When the objective lens follows tracks of the optical disc 2, it is possible to make the objective lens follow the tracks just by driving the tracking actuator 41 via the actuator driver 21 by control of the servo processor 51 within a range in which the objective lens can follow the tracks without moving the optical pick-up 3. On the other hand, in the case where the objective lens cannot follow the tracks without moving the optical pick-up 3, the servo processor 51 drives the sled motor 7 via the sled driver 22 to move the optical pick-up base in the same direction as the direction in which the objective lens was moved, thereby carrying out control so that the objective lens returns to the reference position. This control operation is referred to as sled control. In the movement control of the optical pick-up 3 in accordance with a seek command (a seek operation includes a rough search and a fine search), such sled control is carried out in the case where the rough search is conducted.

When the reflected light detection signals are supplied to the RF amplifier 40 from the split photodiode 6 of the optical pick-up 3, the RF amplifier 40 generates HF (RF) signals, tracking error (TE) signals, focusing error (FE) signals and the like based on such reflected light detection signals. In this regard, the RF signals are analog signals corresponding to pits and lands written on the optical disc 2, and the tracking error signals are signals indicating the size and direction of the shift of the objective lens in the radial direction from the center of the track (i.e., the amount of shift of the objective lens in the radial direction from the center of the track). Further, the focusing error signals are signals indicating the size and direction of the shift of the objective lens in the optical axis direction (rotational axis direction) from the focusing position (i.e., the amount of shift of the objective lens in the optical axis direction (rotation axis direction) from the focusing position).

Further, the RF amplifier 40 generates digitized signals by data-slicing the generated RF signals, and supplies these signals to the signal processing section 30 as data signals for reproducing. The RF amplifier 40 also supplies the generated tracking error signals and focusing error signals to the servo processor 51.

Based on the tracking error signals and the focusing error signals supplied from the RF amplifier 40, the servo processor 51 controls the driving of the actuator 4 and/or the sled motor 7 via the actuator driver 21 and/or the sled driver 22 to properly move the optical pick-up 3 in the radial direction and the optical axis direction of the optical disc 2.

Further, based on WOBBLE signals reproduced from the optical disc 2 or output signals from hall elements (described later), the servo processor 51 controls the driving of the spindle motor 11 via the spindle driver 23 to rotationally drive the optical disc 2 at a predetermined rotational speed.

In response to instructions from the control means 9, the signal processing section 30 demodulates (decodes) the reproduced signals supplied from the RF amplifier 40, and carries out a predetermined signal processing. Then, the signal processing section 30 sequentially supplies the sampling data (EFM signals) and the like obtained by the signal processing such as demodulation and the like to the buffer memory 31, and then such data is supplied to the interface 10 via the buffer memory 31. The buffer memory 31 is constructed from a predetermined capacity RAM (Random Access Memory) or the like, and is a memory for temporarily storing the sampling data (EFM signals) demodulated in the signal processing section 30 and TOC information and the like read out from the lead-in region of the optical disc 2.

In response to instructions from the control means 9, the interface 10 transmits the sampling data (i.e., the data recorded on the optical disc 2) and the like supplied from the buffer memory 31 to an external device (for example, a host computer such as a personal computer (PC) or the like), and receives the commands executed by the optical disc drive 1, the data to be recorded on the optical disc 2 and the like from the external device. The interface 10 uses an existing interface standard such as ATAPI, SCSI or the like.

The flash ROM 32 is a kind of EEPROM (Electrically Erasable and Programmable Read Only Memory) for storing firmware and the like, and generally firmware and the like for carrying out basic control of the optical disc drive 1 are pre-stored in the flash ROM 32.

Figure 3:
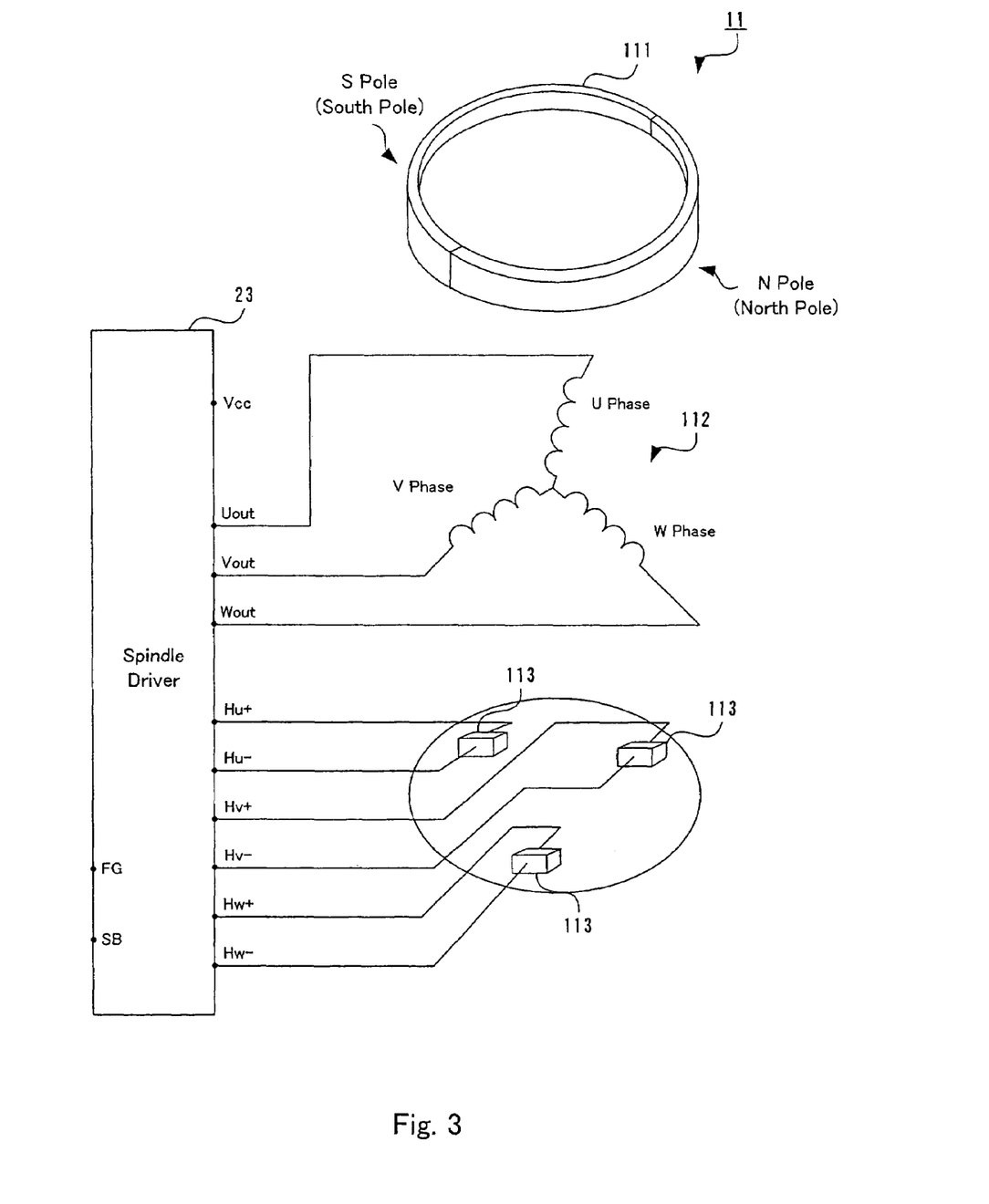
FIG. 3 is an exploded perspective view of the spindle motor 11 in the optical disc drive 1 according to the present invention.

FIG. 3 is an exploded perspective view of the spindle motor 11 in the optical disc drive 1 according to the present invention. The spindle motor 11 of the present invention is a three-phase brushless motor. The spindle motor 11 is equipped with a ring-shaped (annular) magnet rotor 111 bisected into a South pole and a North pole, a coil group (stator) 112 including three coils which phases are mutually shifted by 120 degrees, and three hall elements 113 (position detecting means) which function as position detecting elements for detecting the position of each polarity of the magnet rotor 111. As shown in FIG. 3, the three hall elements (i.e., the position detecting means) are disposed on the magnet rotor so as to be spaced at certain intervals.

In the spindle motor 11, the magnet rotor 111 is rotated by flowing a predetermined electric current through the U, V and W phases of the coil group 112 from the spindle driver 23, which drives the spindle motor 11.

Figure 4:
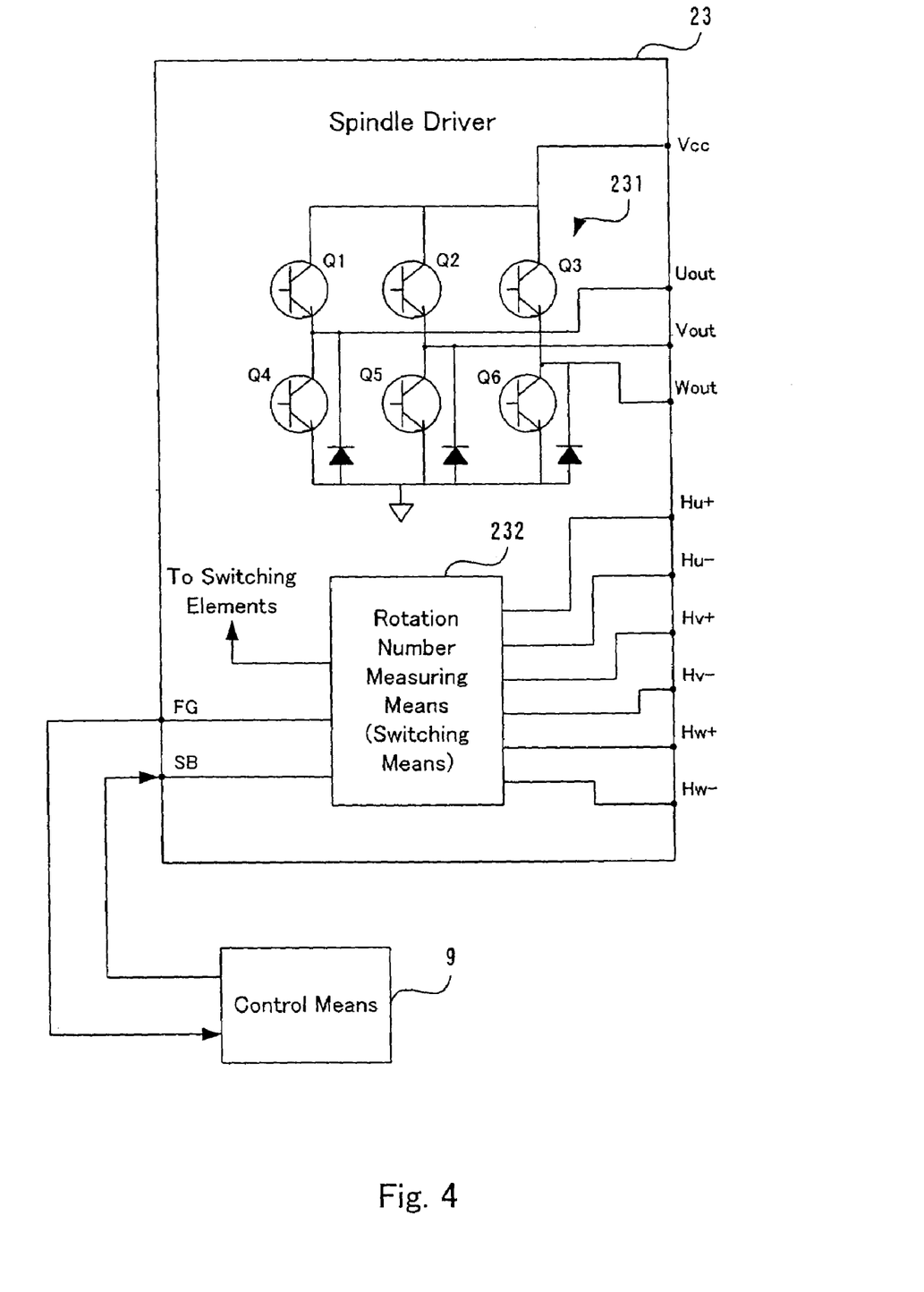
FIG. 4 is a diagram for schematically illustrating the elements inside the driver IC of the spindle driver.

FIG. 4 is a diagram for schematically illustrating the elements inside the driver IC of the spindle driver 23. In FIG. 4, the spindle driver 23 is equipped with six NPN type transistors (switching elements) 231 (Q1-Q6), and rotation number measuring means (switching means) 232 for measuring the rotation number of the magnet rotor 111 based on output pulses of the three hall elements 113 in the spindle motor 11, i.e., the result detected by the position detecting means.

Figure 5:
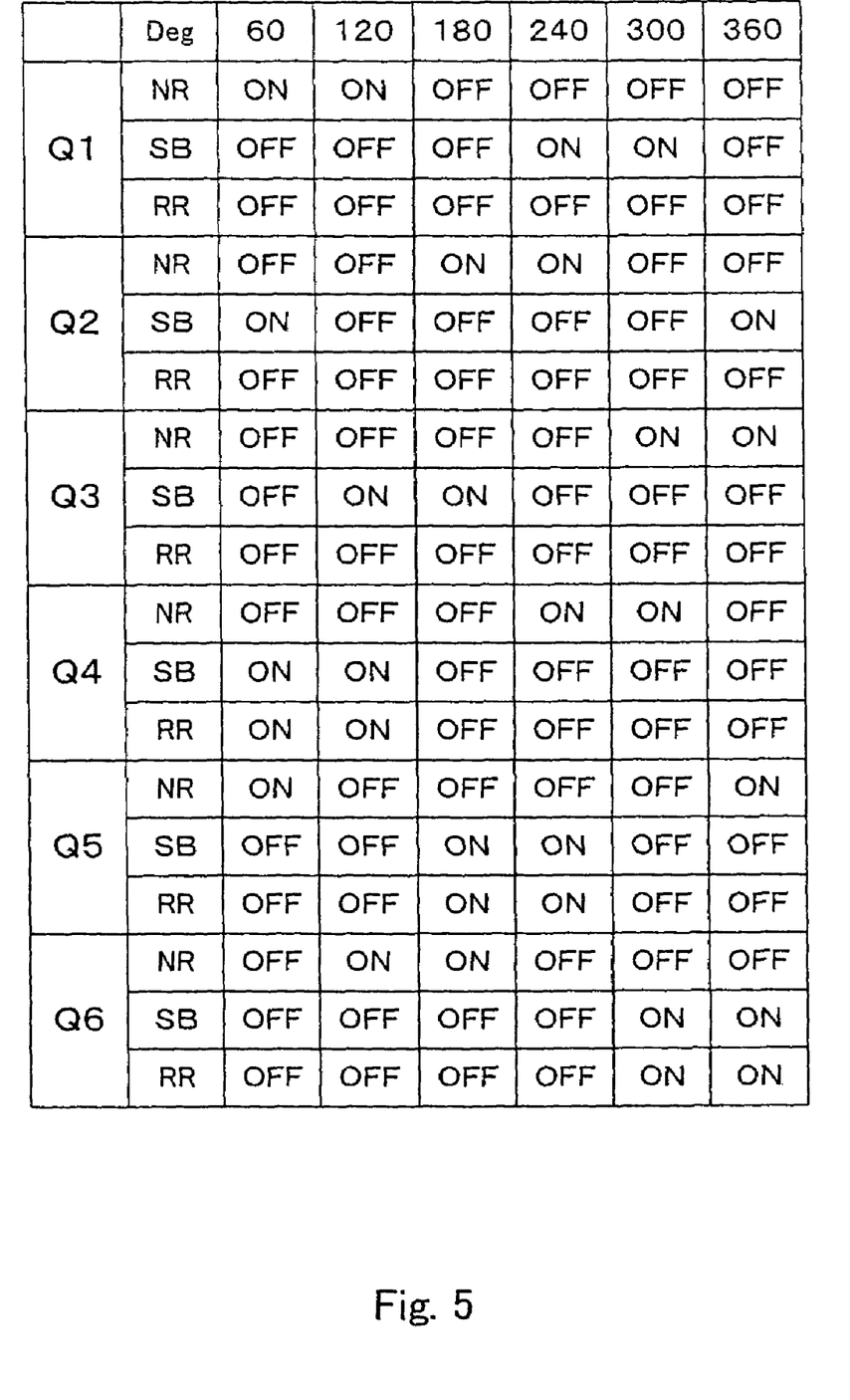
FIG. 5 is a table illustrating a matrix of the ON/OFF control of the transistors shown in FIG. 4.

The ON/OFF control of the transistors Q1-Q6 is carried out by the rotation number measuring means (switching means) 232 in the manner shown in FIG. 5. FIG. 5 is a table illustrating a matrix of the ON/OFF control of the transistors shown in FIG. 4. In FIG. 5, the term "NR" indicates that the magnet rotor 111 of the spindle motor 11 is in a normal rotating state (i.e., it carries out a normal rotation), the term "SB" indicates that the rotation of the magnet rotor 111 is being decelerated or stopped by a short brake, and the term "RR" indicates that the rotation of the magnet rotor 111 is being decelerated or stopped by a reverse rotation brake. For example, at the time of 60 degrees during the rotation of the magnet rotor 111, the transistors Q1 and Q5 are in the ON state, and therefore an electric current flows from the Vcc terminal through the transistor Q1 to the U phase, and from the V phase through the transistor Q5 to the ground terminal.

In this regard, a short brake is a brake method in which each coil of the coil group 112 in the spindle motor 11 is shorted, and the back electromotive force thereof is used to decelerate the rotating magnet rotor 111. Further, a reverse rotation brake is a brake method in which an electric current is supplied to the transistors 231 so as to rotate the magnet rotor 111 in the reverse direction of normal rotation to decelerate or stop the rotating magnet rotor 111.

The rotation number measuring means 232 measures the rotation number of the magnet rotor 111 (i.e., the rotation number of the spindle motor 11) based on output signals (output pulses) from the hall elements 113, and these measured rotation number signals are outputted from an FG terminal of the spindle driver 23 to the control means 9.

Further, the rotation number measuring means 232 that operates as switching means controls the rotation number of the magnet rotor 111 of the spindle motor 11 by respectively outputting the switching signals (ON/OFF signals) inputted from the control means 9 (as shown for "NR" in FIG. 5) to the base terminals of the transistors Q1-Q6 to control the ON/OFF states of the transistors Q1-Q6.

In this case, when a short brake is carried out, the rotation number measuring means 232 controls the ON/OFF states of the transistors Q1-Q6 based on signals (i.e., the switching signals as shown for "SB" in FIG. 5) inputted from the control means 9 via the SB terminal.

Figure 6:
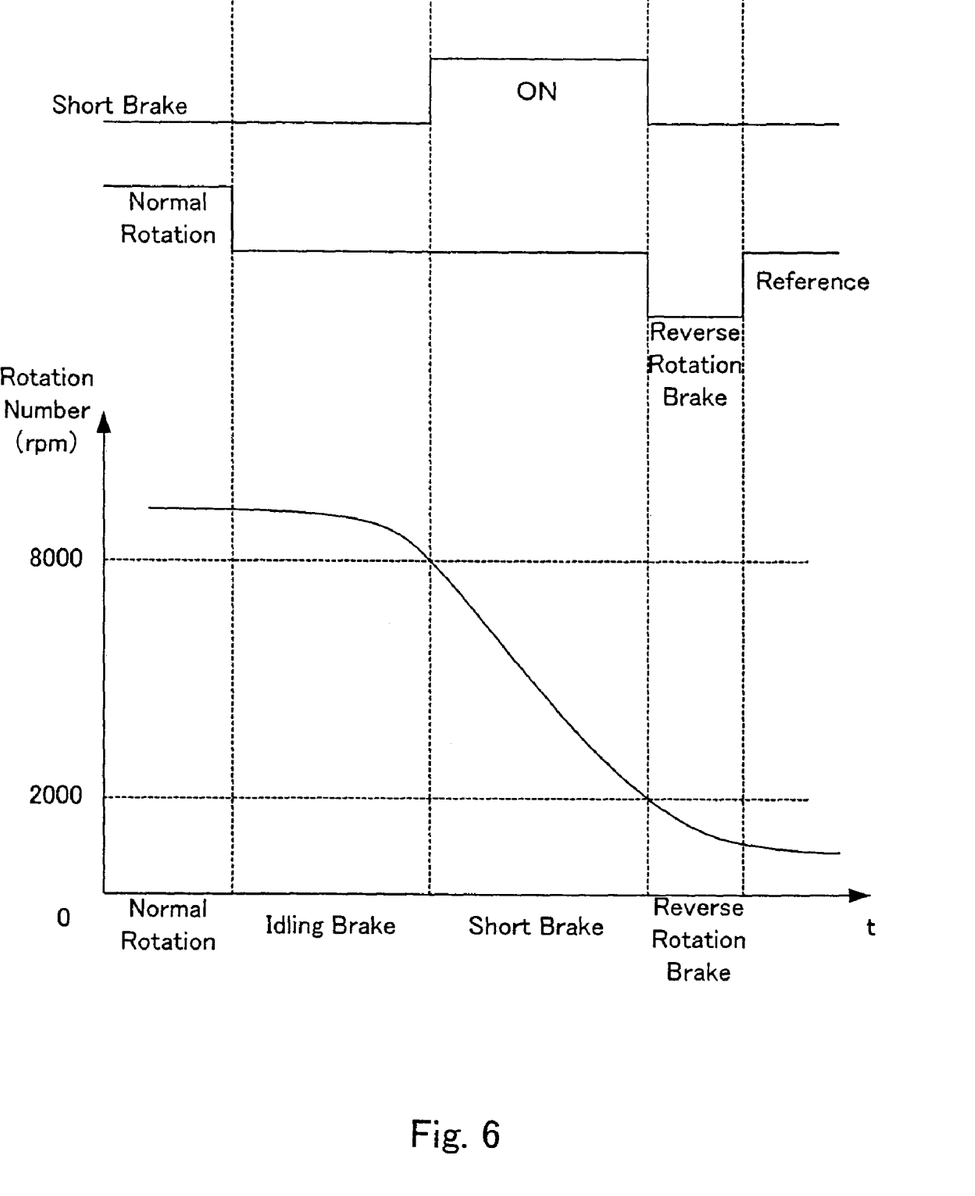
FIG. 6 is a graph illustrating the relationship between the types of brake and the rotation number of the spindle motor.

FIG. 6 is a graph illustrating the relationship between the types of brake modes and the rotation number of the spindle motor 11. As shown in the graph of FIG. 6, the optical disc drive 1 of the present invention applies three types of brake modes, but the brake modes are not limited to three types. In the present invention, the brake modes may include at least three types.

When the spindle motor 11 is rotating at 48× speed, namely, when the optical disc 2 is rotated at this rotational speed, the optical disc drive 1 rotates the optical disc 2 at approximately 10,000 rpm. In this case, when a stop signal for the optical disc 2 is inputted to the spindle driver 23 from the control means 9, all the transistors Q1-Q6 are switched to OFF to apply an idling brake (first brake mode) which uses windage loss to carry out braking until the rotation number of the spindle motor 11 reaches approximately 8,000 rpm. Then, when the rotation number measuring means 232 detects that the rotation number has fallen below 8,000 rpm, the rotation of the magnet rotor 111 is decelerated by switching ON the short brake (second brake mode). Next, when the rotation number measuring means 232 detects that the rotation number has fallen below 2,000 rpm, the reverse rotation brake (third brake mode) is carried out until the magnet rotor 111 is decelerated down to a target rotation number and stopped. In this way, the control means 9 (i.e., the rotation number measuring means) monitors the rotation number of the magnet rotor 111 in the spindle motor 11 during the brake operation in order to complete such brake operation in as short a time as possible.

In the case where the rotation of the magnet rotor 111 is not stopped within a predetermined time after the brake operation command is outputted from the control means 9 to the spindle driver 23, an error signal will be outputted for each application of the optical disc drive 1 and the host PC. For this reason, the brake operation is preferably completed within about 5 seconds from the generation of the brake command of the control means 9.

In this regard, the effect of brake by idling is not very good when the rotation number of the magnet rotor 111 is low, but is effective when the rotation number is high. For this reason, the combination of idling (idle running), short brake and reverse rotation brake (applied sequentially depending on the rotation number) is preferably like that shown in FIG. 6. Namely, the idling is carried out in a high-speed range (higher than 8,000 rpm), the short brake is carried out in a medium-speed range (2,000-8,000 rpm), and the reverse rotation brake is carried out in a low-speed range (less than 2,000 rpm).

Figure 7:
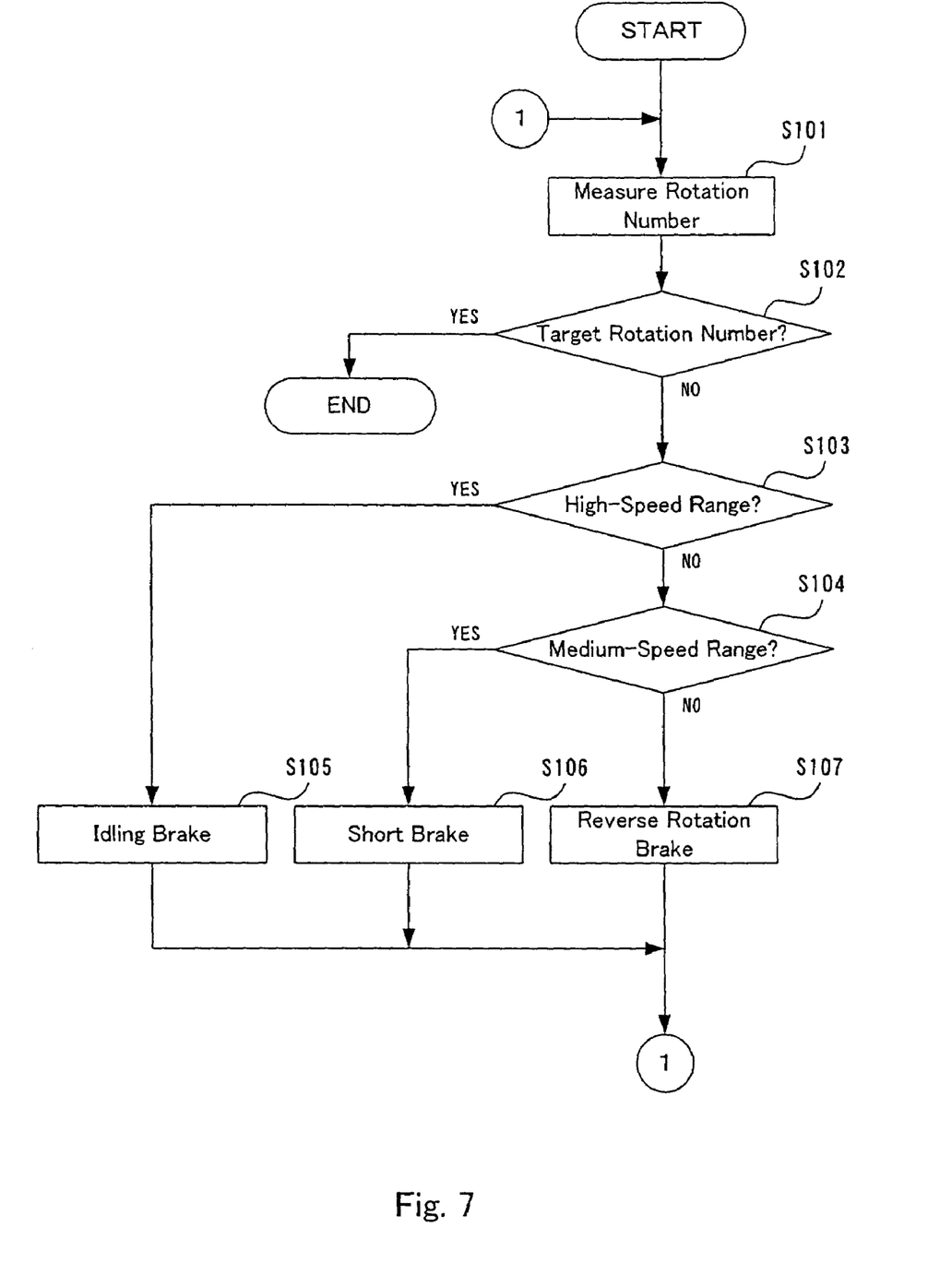
FIG. 7 is a flowchart of the brake control process of an optical disc drive in the preferred embodiment according to the present invention.

Next, the operation of the optical disc drive in the preferred embodiment according to the present invention will be described with reference to the flowchart of FIG. 7. FIG. 7 is a flowchart of the brake control process of an optical disc drive 1 shown in FIGS. 1 and 2 in the preferred embodiment according to the present invention. This flowchart is described below using each of the elements shown in FIGS. 1-4 described above.

When a brake command is outputted from the control means 9 during the rotation of the optical disc 2 (i.e., the spindle motor 11), the optical disc drive 1 of the present invention carries out this brake control process) brake control program). Namely, when the control means 9 outputs a brake command, the rotation number measuring means 232 measures the current rotation number of the magnet rotor 111 based on the position detecting signals inputted from the hall elements (position detecting means) 113 (Step S101), and outputs such measured rotation number from the FG terminal to the control means 9.

At Step S102, the control means 9 (judging means) judges whether or not the rotation number of the magnet rotor 111 obtained from the rotation number measuring means 232 has reached a target rotation number. In the case where it is judged that the rotation number has reached the target rotation number, the control means 9 completes the brake control process.

In this regard, the "target rotation number" is a rotation number pre-set in the optical disc drive 1, and includes a predetermined rotation number at which the rotation of the optical disc 2 is assumed (considered) to be stopped. In addition, this "target rotation number" also includes the rotation number in the case where the optical disc 2 is to be held in standby at a predetermined rotation number.

In the case where the measured rotation number of the magnet rotor 111 has not reached the target rotation number, the control means 9 (selecting means and judging means at Steps S103-S107) judges whether or not such rotation number is in a high-speed range (higher than 8,000 rpm in the present embodiment) based on the measured rotation number of the magnet rotor 11 (Step S103). In the case where it is judged that the rotation number is in the high-speed range, the control means 9 selects the idling brake (Step S105), controls the rotation number measuring means 232 so as to switch all the transistors Q1-Q6 to the OFF state. Then, the process (program) returns to Step S101, and the optical disc drive 1 carries out the same process, namely, and once again the rotation number of the magnet rotor 111 is measured (monitored).

At Step S103, in the case where it is judged that the measured rotation number is not in the high-speed range, the control means 9 then judges whether or not the measured rotation number is in an medium-speed range (2,000-8,000 rpm in the present embodiment) (Step S104). In the case where it is judged that the measured rotation number is in the medium-speed range, the control means 9 selects the short brake (Step S106), and outputs control signals for short brake to the rotation number measuring means 232 via the SB terminal. The rotation number measuring means 232 controls the ON/OFF states of the transistors Q1-Q6 (switching elements 231) based on the table shown in FIG. 5. Then, the process (program) returns to Step S101, and once again the rotation number of the magnet rotor 111 is measured (monitored).

At Step S104, in the case where it is judged that the measured rotation number is not in the medium-speed range, the current rotation number of the magnet rotor 111 lies within a low-speed range (less than 2,000 rpm in the present embodiment). Then, the control means 9 selects the reverse rotation brake (Step S107), and outputs control signals for reverse rotation brake to the rotation number measuring means 232. The rotation number measuring means 232 controls the ON/OFF states of the transistors Q1-Q6 (switching elements 231) based on the table shown in FIG. 5. Then, the process (program) returns to Step S101, and once again the rotation number of the magnet rotor 111 is measured (monitored).

In this way, during the brake operation, the control means 9 monitors the rotation number of the magnet rotor 111, and selects a brake method according to the measured rotation number until it is judged that such rotation number reaches the target rotation number at Step S102. When the rotation number reaches the target rotation number, the brake control process (the brake control program) is completed.

As described above, according to the optical disc drive 1 and the optical disc brake control method in the preferred embodiments of the present invention, when the spindle motor 11 is rotating at a high speed, idling is carried out to decelerate the rotation of the spindle motor 11 to a predetermined rotation number. Then, when the rotation number reaches an medium-speed range and a low-speed range, a short brake and a reverse rotation brake are respectively carried out to decelerate and stop the rotation of the spindle motor 11.

Accordingly, the present invention makes it possible to prevent excessive electric current from flowing into the driver IC of the spindle driver. Therefore, since the driver IC is not damaged due to heating or the like, it is possible to extend the life of the driver IC and improve the reliability thereof.

Further, in the present invention, since the deceleration and stopping of the spindle motor is controlled by stepwise changing the brake methods in accordance with high-speed range, medium-speed range and low-speed range, excessive electric current can be prevented from flowing into the driver IC, and it is possible to complete the brake operation in a shorter time.

It should be noted that, in the embodiments described above, the values 8,000 rpm and 2,000 rpm were used as threshold values to describe the high-speed, medium-speed and low-speed ranges, but the present invention is not limited to these values. In the present invention, any desired values may be used within the range in which the spindle motor can be stopped within the predetermined time required by the application software of the optical disc drive and the host computer described above.

As described above, it should be noted that, even though the optical disc drive and the brake control method of the present invention has been described with reference to the preferred embodiments shown in the drawings, the present invention is not limited to these embodiments, it is of course possible to make various modifications or deformations to each element of the optical disc drive, and various elements described above can be replaced with any other element capable of performing the same or a similar function.

It is also possible to apply the optical disc drive of the present invention to other various optical disc drives for recording and/or reproducing data onto and/or from various types of optical discs such as DVD-RW, DVD-RAM and the like.

What is claimed is:

1. An optical disc drive which can record and/or reproduce data onto and/or from an optical disc, the optical disc drive comprising:
   a three-phase spindle motor for rotating the optical disc, the spindle motor having three coils;
   rotation number measuring means for measuring the rotation number of the spindle motor;
   brake means for braking the spindle motor to reduce the rotation number thereof to finally stop the rotation of the spindle motor, the brake means including at least three types of brake modes, the at least three types of brake modes including a first brake mode which uses windage loss by idling of the spindle motor, a second brake mode which uses a short brake that is made by causing short circuit in between any two coils of the three coils in the spindle motor, and a third brake mode which uses a reverse rotation brake that is made by controlling the current flow so as to rotate the spindle motor in the reverse direction of the normal rotation; and selecting means for selecting one of the three types of brake modes in response to the rotation number measured by the rotation number measuring means when the rotation number of the spindle motor is to be reduced, wherein the selecting means selects the first brake mode to reduce the rotation number of the spindle motor using the windage by the idling of the spindle motor when the rotation number exceeds a first predetermined threshold value, to thereby reduce the rotation number of the spindle motor below the first threshold value, then when the rotation number of the spindle motor is reached at the first threshold value, the selecting means selects the second brake mode to carry out the short brake to thereby reduce the rotation number of the spindle motor below a second predetermined threshold value, and then when the rotation number of the spindle motor is reached at the second threshold value, the selecting means selects the third brake mode to carry out the reverse brake to thereby stop the rotation of the spindle motor, and wherein the selection of the brake modes is operated only when the spindle motor rotates at a high rotational speed above the first threshold value.

2. The optical disc drive according to claim 1, further comprising judging means for judging whether the rotation number of the spindle motor measured by the rotation number measuring means reaches one of the threshold values when the brake means is applied to the spindle motor.

3. The optical disc drive according to claim 1, wherein the spindle motor includes a magnet rotor, the optical disc drive further comprising position detecting means for detecting the position of the magnet rotor in the spindle motor, the position detecting means including a plurality of Hall elements disposed on the magnet rotor so as to be spaced at certain intervals and the rotation number measuring means measures the rotation number of the spindle motor based on the pulse number outputted from the plurality of Hall elements.

4. The optical disc drive according to claim 1, further comprising a driver for driving the spindle motor, the driver including a plurality of switching elements and switching means for switching between on and off of each of the plurality of switching elements wherein the selection of the brake modes is carried out by switching these switching elements by means of the switching means.

5. The optical disc drive according to claim 4, wherein each of the plurality of switching elements is constituted from an NPN type transistor.

6. A brake control method of an optical disc drive, the optical disc drive being capable of recording and/or reproducing data onto and/or from an optical disc by rotating the optical disc by means of a three phase spindle motor, and the optical disc drive including brake means for braking the spindle motor to reduce the rotation number thereof to finally stop the rotation of the spindle motor, the brake means including at least three types of brake modes including a first brake mode which uses windage loss by idling of the spindle motor, a second brake mode which uses a short brake that is made by causing a short circuit between any two coils of the three coils in the spindle motor, and a third brake mode which uses a reverse rotation brake that is made by controlling the current flow so as to rotate the spindle motor in a reverse direction of rotation, the method comprising the steps of:

a) measuring the rotation number of the spindle motor;

b) selecting the first brake mode to reduce the rotation number of the spindle motor using the windage by the idling of the spindle motor when the rotation number exceeds a predetermined first threshold value, to thereby reduce the rotation number of the spindle motor below the first threshold value;

c) selecting the second brake mode to carry out the short brake when the rotation number of the spindle motor is reached at the first threshold value, to thereby reduce the rotation number of the spindle motor below a predetermined second threshold value, and d) selecting the third brake mode to carry out the reverse brake when the rotation number of the spindle motor is reached at the second threshold value, to thereby stop the rotation of the spindle motor, wherein the above selection of the brake modes is operated when the spindle motor rotates at a rotational speed above the first threshold value.

* * * * *